(12) United States Patent
Yukawa et al.

(10) Patent No.: US 6,418,790 B1
(45) Date of Patent: Jul. 16, 2002

(54) ANGULAR VELOCITY SENSOR

(75) Inventors: Junichi Yukawa, Nara; Katsunori Matsubara, Osaka, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/807,756

(22) PCT Filed: Aug. 17, 2000

(86) PCT No.: PCT/JP00/05491

§ 371 (c)(1),
(2), (4) Date: Aug. 2, 2001

(87) PCT Pub. No.: WO01/13066

PCT Pub. Date: Feb. 22, 2001

(30) Foreign Application Priority Data

Aug. 18, 1999 (JP) ............................................. 11-231098

(51) Int. Cl.⁷ .............................................. G07C 19/00
(52) U.S. Cl. ...................... 73/504.12; 73/1.77; 310/315
(58) Field of Search .......................... 73/504.02, 504.12, 73/504.15, 504.16, 1.77; 310/315, 316, 317

(56) References Cited

U.S. PATENT DOCUMENTS

| | | | |
|---|---|---|---|
| 5,293,779 A | 3/1994 | Nakamura et al. | |
| 5,908,986 A | 6/1999 | Mitamura | |
| 5,932,802 A * | 8/1999 | Ogawa | 73/504.02 |
| 5,939,630 A * | 8/1999 | Nozoe et al. | 73/504.16 |
| 6,220,094 B1 * | 4/2001 | Ichinose et al. | 73/504.16 |

FOREIGN PATENT DOCUMENTS

| | | |
|---|---|---|
| EP | 0 638 782 | 2/1995 |
| EP | 0 834 719 | 4/1998 |
| EP | 0 905 479 | 3/1999 |
| JP | 3-226620 | 10/1991 |
| JP | 4-278414 | 10/1992 |
| JP | 09170926 | 6/1997 |

* cited by examiner

*Primary Examiner*—Richard A. Moller
(74) *Attorney, Agent, or Firm*—Wenderoth, Lind & Ponack, L.L.P.

(57) ABSTRACT

An angular velocity sensor includes first exciters providing a vibrator with drive vibration, a piezoelectric element having a vibration detector for detecting vibration level of the vibrator, and Coriolis detectors for detecting Coriolis vibration depending on an input angular velocity, and including a driving circuit for receiving a signal from the vibration detector and issuing a signal to the first exciters and a detection circuit for receiving signals from the Coriolis detectors. The circuit section further includes a level judging circuit for judging abnormal levels of electric charges in the Coriolis detectors and a fail detector for issuing an output when abnormality is detected. Each output of the Coriolis detectors contains a drive vibration component larger than the reference level of the level judging circuit, and the layout of the electrodes in the element section is adjusted so that combined output may contain the component smaller than the reference level.

11 Claims, 5 Drawing Sheets

ANGULAR VELOCITY SENSOR

TECHNICAL FIELD

The present invention relates to an angular velocity sensor used in a vehicle brake control or a roll air bag system.

BACKGROUND ART

A conventional angular velocity sensor is disclosed, for example, in Electrical Equipment Technical Conference Report (Vol. 38, No, 3, 1994, pp. 26–33). The angular velocity sensor comprises an exciter for providing a tuning fork vibrator with vibration, a detector for detecting the vibration level of the vibrator, a detector for detecting a Coriolis force generated depending on an angular velocity, a first amplifier for amplifying the output of the detector for detecting the vibration level, and a variable gain amplifier connected to the exciter for maintaining a constant amplitude of the tuning fork vibrator by varying the gain according to the output of a comparator. The variable gain amplifier amplifies a voltage shifted in phase by 90 degrees from the output voltage of the first amplifier.

The conventional sensor hardly detects a breakage of a connection line between a detecting electrode and a detecting circuit, a sensitivity change due to a deterioration of the detection electrode, or trouble in the detection circuit, and accordingly, hardly has reliability.

SUMMARY OF THE INVENTION

The invention is intended to solve the problems of the prior art, and it is hence an object thereof to present an angular velocity sensor for detecting a trouble or a deterioration of itself.

To solve the problems, the invention presents an angular velocity sensor comprising an element section including a first exciter for providing a vibrator with drive vibration, a vibration detector for detecting the vibration level of the vibrator, and a piezoelectric element having at least two Coriolis detectors for detecting Coriolis vibration generated depending on an input angular velocity, and also comprising a circuit section including a driving circuit receiving a signal from the vibration detector and issuing a signal to the first exciter and a detection circuit for receiving signals from the Coriolis detectors. The circuit section further comprises a level judging circuit for judging an abnormal level of electric charges occurring in the Coriolis detectors and output means for issuing an output when detecting an abnormality. Each output of Coriolis detectors contains independently a drive vibration component larger than the reference level of the level judging circuit. And the layout of the electrodes the element section is adjusted so that the combined output may contains the vibration component smaller than the reference level. And therefore, if one of input lines from the Coriolis detector to the detection circuit is broken, this abnormality can be detected by the level judging circuit.

DETAILED DESCRIPTION OF THE PREFERRED EMBODIMENTS OF THE INVENTION (Exemplary Embodiment 1)

Figure 1:
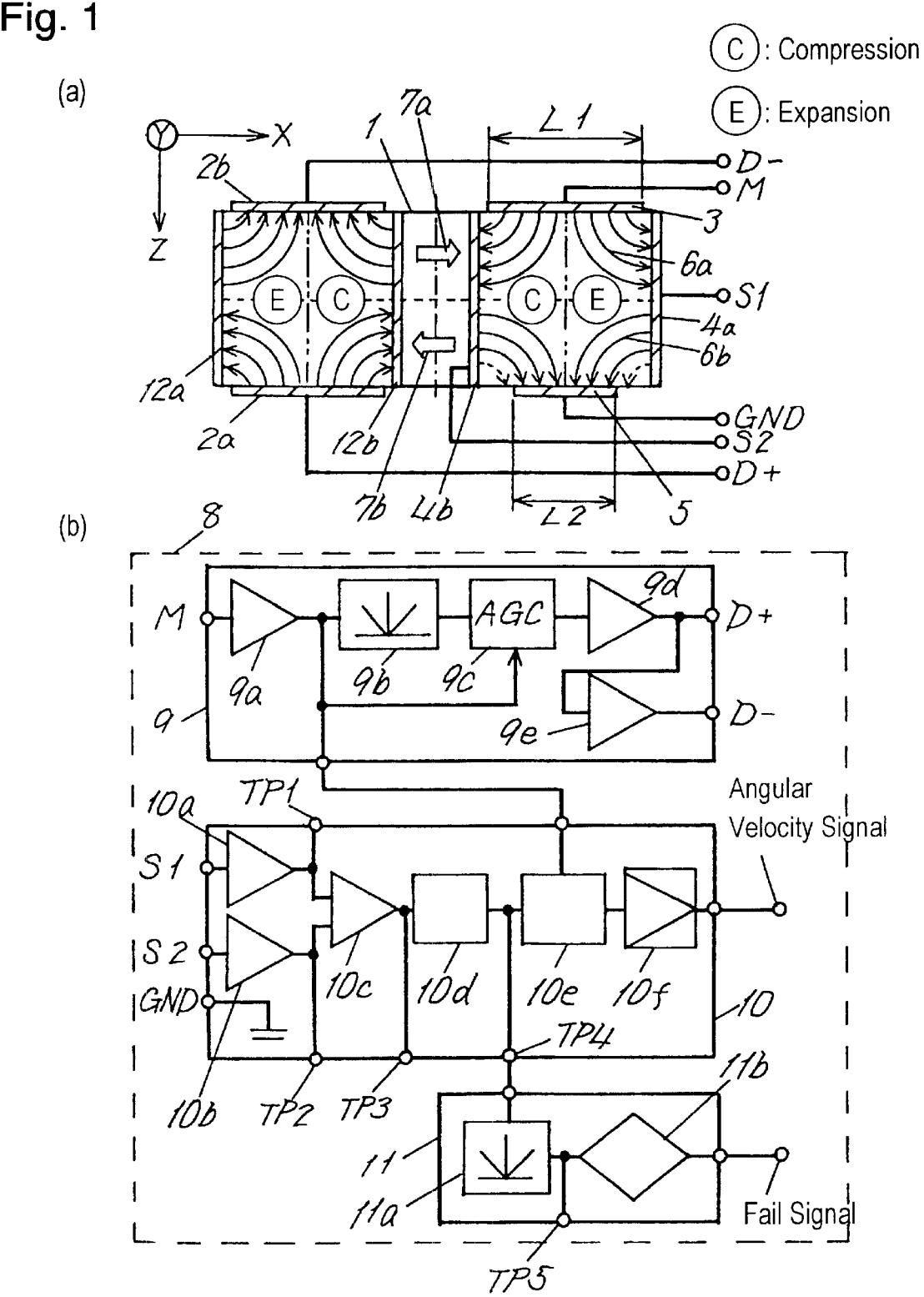
FIG. 1(a) is a block diagram of an angular velocity sensor according to embodiment 1 of the present invention.
FIG. 1(b) is a circuit diagram of a circuit section of the sensor.

FIG. 1 shows an angular velocity sensor according to exemplary embodiment 1 of the present invention.

In FIG. 1(a), reference numeral 1 denotes a vibrator of a bimorph tuning fork type angular velocity sensor composed of piezoelectric elements laminated in the thickness direction, and reference numerals 7a, 7b indicate the directions of polarization axes of each layer. Reference numerals 2a, 2b denote first exciters for inducing a drive vibration on the vibrator 1. Reference numeral 3 denotes a vibration detector composed of electrodes in the vibrator 1 for detecting the vibration level of the vibrator 1. Reference numeral 5 denotes a fail signal generator disposed on a surface opposite the vibration detector 3, and having a smaller width than the electrode of the vibration detector 3. Reference numerals 4a, 4b denote Coriolis detectors composed of electrodes disposed on the vibrator 1 for detecting a Coriolis force generated depending on angular velocity.

FIG. 1(b) shows a circuit section 8. Reference numeral 9 denotes a driving circuit. Reference numeral 10 denotes a detecting circuit for receiving an electric charge occurring in the electrodes of the Coriolis detectors 4a, 4b, and for converting the charge into a voltage corresponding to the magnitude of the angular velocity. Reference numeral 11 denotes a fail detector having a level judging circuit for detecting a failure in the detection circuit 10 due to an excess electric charge generated in the Coriolis detectors 4a, 4b.

The driving circuit 9 is connected to the vibration detector (M terminal) 3 of the vibrator 1. The circuit 9 comprises a monitor amplifier 9a for amplifying the electric charge generated by the vibration of the vibrator 1 detected by the vibration detector 3, a rectifying circuit 9b for full-wave-rectifying the output of the amplifier 9a, an automatic gain controller (AGC) 9c for maintaining a constant amplitude of the output of the vibrator 1, and driving amplifiers 9d, 9e connected to first exciters 2a (terminal D+), 2d (terminal D−) of the vibrator 1 for driving the vibrator 1. The circuit 9 makes the vibrator 1 vibrate at the resonance frequency of the vibrator.

At this time, the driving amplifiers 9d, 9e applies alternating-current signals of reverse phase against each other to the first exciters 2a, 2b, respectively. The driving current applied to the electrode of the first exciter 2a flows into the electrode of the first exciter 2b through relay electrodes 12a, 12b, and the X-axis direction component of this current generates a stress for triggering drive vibration. Herein, since the vibrator 1 is composed of a piezoelectric element, the relay electrodes 12a, 12b are automatically biased at the middle potential between the electrodes of the first exciters 2a, 2b by the a capacitive component formed by the electrodes of the first exciters 2a, 2b.

The detection circuit 10, which is connected to Coriolis detectors 4a (terminal S1) and 4b (terminal S2), comprises sensor amplifiers 10a, 10b for amplifying the electric charges, which are generated in the Coriolis detectors 4a, 4b on the basis of the Coriolis force corresponding to a rotational angular velocity applied to the vibrator 1, a differential combining unit 10c for differentially combining the outputs of the sensor amplifiers 10a, 10b, a phase shifter 10d for shifting the phase of the output of the differential combining unit by 90 degrees, a synchronous detector 10e for demodulating the signal by a Coriolis vibration modulated by the vibration of the vibrator 1, and a low pass filter 10f for cutting off unnecessary band and for amplifying a DC component. The circuit 10 issues an angular velocity signal.

The fail detector 11 comprises a rectifying circuit 11a for receiving the output of the phase shifter 10d and for fullwave rectifying it, and a level judging circuit 11b for judging the level of the rectified output. The detector 11 issues a DIAG signal to an outside computer when the sensor is irregular.

FIG. 1(a) is a sectional view of the vibrator 1, and shows a certain moment when it is being driven and vibrating. Reference numerals 6a, 6b denote the electric charges generated due to the vibration.

In the angular velocity sensor of the bimorph tuning fork vibration type, since the electric charges 6a and 6b are ususally equal, the electric charge 6a flows into the electrodes of the Coriolis detectors 4a, 4b from the vibration detector 3. Then, the electric charge 6b flows into the fail signal generator 5 connected to the GND terminal of the circuit section 8, so that the drive vibration components are canceled, and only the Coriolis vibration component is consequently issued.

However, by forming the electrode width (L2) of the fail signal generator 5 of the present invention smaller than the electrode width (L1) of the vibration detector 3, the drive vibration components are intentionally imbalanced, and drive vibration components are then issued to the Coriolis detectors 4a, 4b.

The drive vibration components generated by the imbalance are inphase signals in the Coriolis detectors 4a, 4b, and hence canceled in the differential combining unit 10c in the detection circuit 10.

Figure 2:
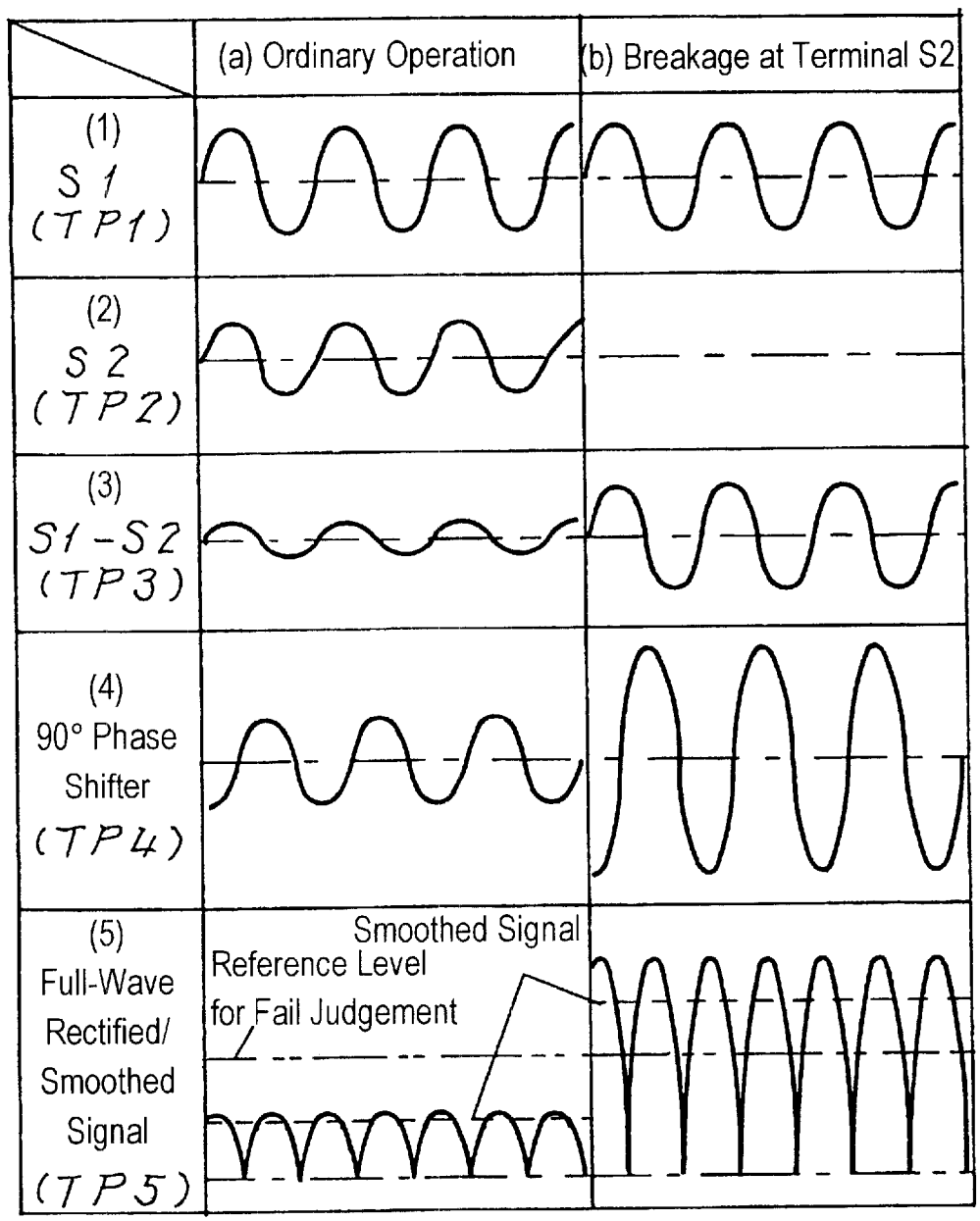
FIG. 2 is a diagram for explaining a signal waveform in the angular velocity sensor according to embodiment 1 of the present invention.

FIG. 2 shows the operations. Column (a) of FIG. 2 shows waveforms of the circuit section 8 in ordinary operation, in which signals (1) and (2) show voltage conversion of charges on the basis of the drive vibration appearing in the Coriolis detectors 4a, 4b, and they represent signals TP1, TP2 in FIG. 1, respectively.

In column (a) of FIG. 2, a signal (3) is a differential portion of the two signals, representing a signal TP3 in FIG. 1. Since the two signals are in phase, the differential signal is zero if the level is equal. On the other hand, in column (a) of FIG. 2, a signal (4) is that formed by shifting the signal (3) in phase by 90 degrees and amplifying it, representing the signal TP2 in FIG. 1. A signal (5) is a full-wave rectified signal of the signal (4), representing a signal TP5 in FIG. 1. Its smoothed signal level is lower than a criterion of the succeeding level judging circuit 11b.

Column (b) of FIG. 2 shows signals at a breakage of the Coriolis detector 4b (terminal S2). Since the signal TP2 of the signal (2) is lost, the waveform of the signal (1) (TP1) appears directly in the waveform (3) (TP3) after the differential combination. The waveform shifted by 90 degrees by the phase shifter and amplified is shown as the signal (4) (TP4). Its full-wave rectified waveform is shown as the signal (5) (TP5). Its smoothed signal level exceeds the criterion of the succeeding level judging circuit 11b, so that the sensor may issue a fail signal to an outside computer.

At this time, if not canceling signals enough due to an electrode deviation or the like, the differential combining unit 10c may be adjusted precisely by trimming the electrodes of the fail detector or the like.

(Exemplary Embodiment 2)

Figure 3:
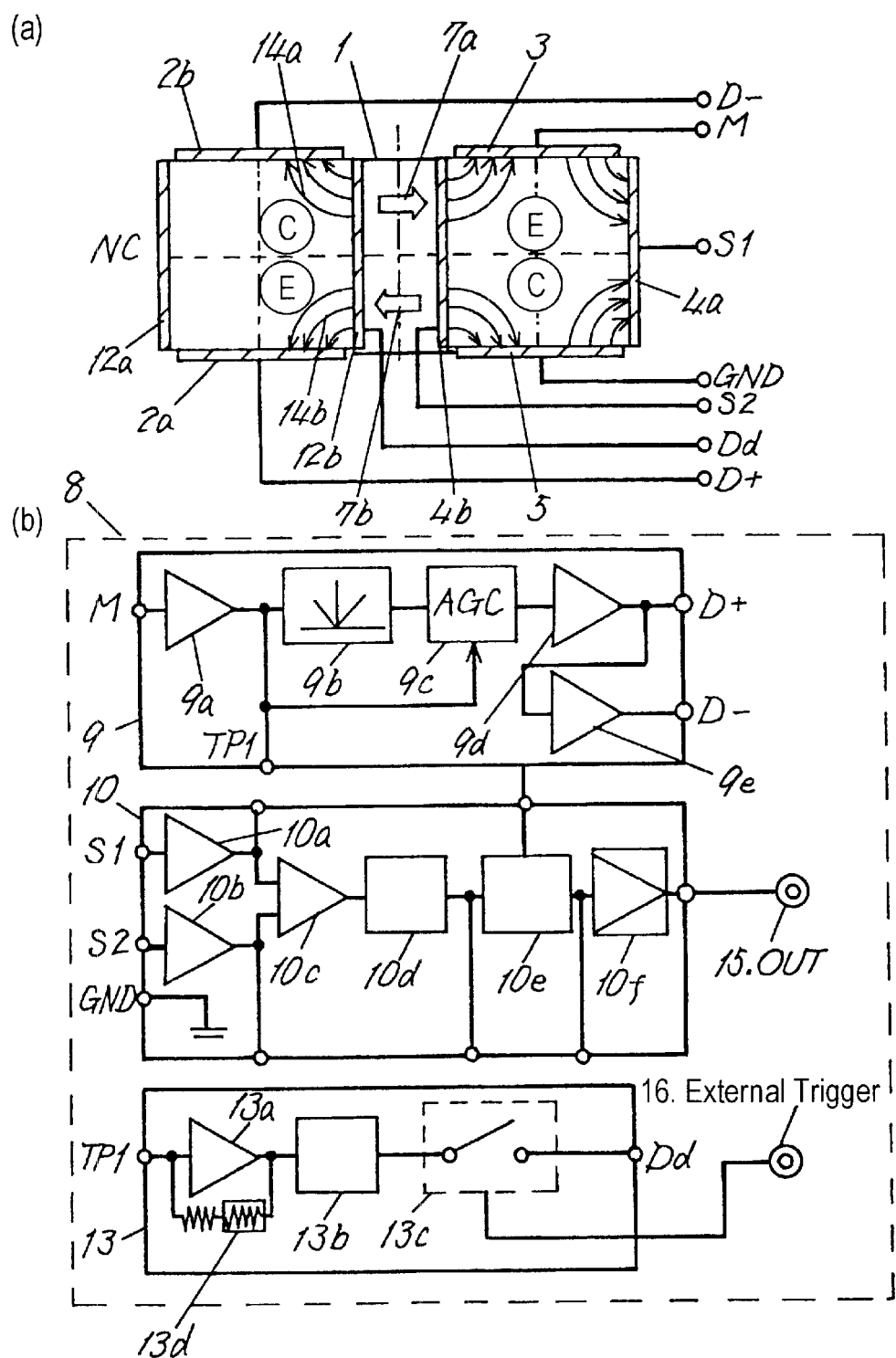
FIG. 3(a) is a block diagram of an angular velocity sensor according to embodiment 2 of the present invention.
FIG. 3(b) is a circuit diagram of a circuit section of the sensor.

FIG. 3 shows an angular velocity sensor according to exemplary embodiment 2 of the present invention.

In FIG. 3(a), reference numeral 1 denotes a vibrator of a bimorph tuning fork type angular velocity sensor comprising piezoelectric elements laminated in the thickness direction. Reference numerals 7a, 7b denote the directions of polarization axes of the layers. Reference numerals 2a, 2b denote first exciters. Reference numeral 12b denotes a second exciter used also as a relay electrode for inducing a pseudo-Coriolis vibration. Reference numeral 3 denotes a vibration detector comprising electrodes disposed on the piezoelectric elements for detecting the vibration level of the vibrator 1. Reference numeral 5 denotes a grounding electrode disposed on a surface opposite the vibration detector 3. Reference numerals 4a, 4b denote Coriolis detectors comprising electrodes disposed on the piezoelectric elements for detecting the Coriolis force generated depending on the angular velocity.

FIG. 3(b) shows a circuit section 8. Reference numeral 9 denotes a driving circuit. Reference numeral 10 denotes a detection circuit for receiving an electric charge occurring in the electrodes of the Coriolis detectors 4a, 4b and for converting the charge into a voltage corresponding to the magnitude of the angular velocity. Reference numeral 13 denotes a second driving circuit for inducing a pseudo-Coriolis vibration by applying an external trigger 16 to the second exciter 12b.

The vibrator 1 is caused to vibrate at the resonance frequency of the vibrator by the driving circuit 9. At this time, the driving amplifiers 9d, 9e apply alternating-currents of reverse phase against each other to the first exciters 2a, 2b, respectively. The driving current applied to the electrode of the first exciter 2a flows into the electrode of the first exciter 2b through the relay electrodes, i.e., second exciters 12a, 12b, and the X-axis direction component of the current generates a stress for triggering a drive vibration.

When a rotational angular velocity is applied to this sensor, Coriolis force occurs, and then electric charges are generated in the electrodes of the Coriolis detectors 4a, 4b. The electrodes of the Coriolis detectors 4a, 4b are disposed so that the electric charges occurring therein are reverse in phase against each other. The charges are differentially-combined in the differential combining unit 10c of the detection circuit 10, and shifted in phase by 90 degrees by the phase shifter 10d. Then, the combined signal is detected by the synchronous detector 10e, and the high frequency range of the combined signal is cut off by the low pass filter 10f. Then, the signal is amplified, and an angular velocity signal is issued.

A signal from the vibration detector 3, which is based on the drive vibration of the vibrator 1, is passed through the driving circuit 9 into an amplifier 13a as an input to the second driving circuit 13. A succeeding phase shifter 13b shifts the signal in phase by 90 degrees and produces a signal shifted in phase by 90 degrees from the drive vibration. And the signal is applied to the electrode 12b of the second exciter on the basis of an ON/OFF switching state of the external trigger 16.

FIG. 3(a) is a diagram showing currents in the vibrator 1 at a moment when a signal is applied to the second exciter 12b for inducing the pseudo-Coriolis vibration. Reference numerals 14a and 14b denote currents flowing from the second exciter 12b due to the signal. The pseudo-Coriolis force is produced by a contraction stress and an expansion stress generated by the current 14a and the current 14b, respectively.

Figure 4:
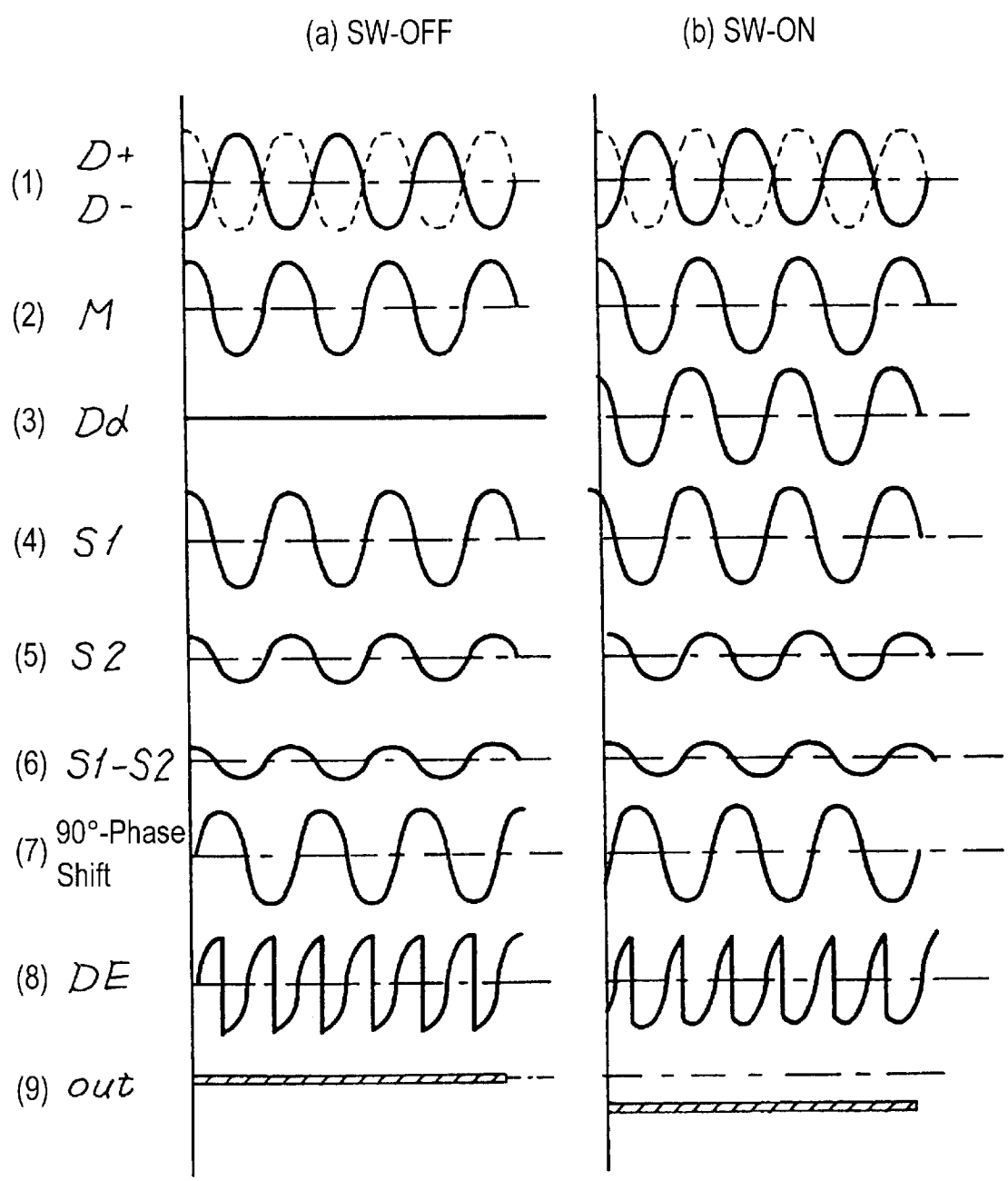
FIG. 4(a) is a diagram for explaining a signal waveform of the angular velocity sensor according to embodiment 2 of the present invention.
FIG. 4(b) is a diagram for explaining a signal waveform of the angular velocity sensor according to embodiment 2 of the present invention.

FIG. 4 is a diagram of signal waveforms showing the operations. FIG. 4(a) shows an ordinary operation, when the external trigger 16 is in an OFF state. FIG. 4(b) shows an operation when the external trigger 16 is in an ON state. In FIG. 4(b), a signal (3), which is the signal shifted in phase by 90 degrees from the signal from the vibration detector 3, is fed into the second exciter 12b. The signal, which is a signal shifted in phase by 90 degrees from a signal (1) of drive vibration, can induce vibration in phase with the Coriolis vibration.

The electric charges generated by the pseudo-Coriolis vibration appear in two Coriolis detectors 4a, 4b in reverse phase against each other and are differentially-combined. A signal (6) shows the waveform after the differential combination. The drive vibration component thereof, which is included in the signal (6), is transformed into the signal (8) through the operations in the succeeding phase shifter and the synchronous detector.

When the external trigger is in the OFF state, shown in FIG. 4(a), areas of the detected signal waveform are equal above and below the center line, and the smoothed DC waveform 9 (output 15) thus becomes zero. Whereas, when the external trigger is the ON state as shown in FIG. 4(b), a difference between the areas above and below the center line in the detected signal generates a DC offset in the smoothed DC waveform 9 (output 15).

In the angular velocity sensor having such configuration, a specified pseudo-Coriolis vibration can be generated in the vibrator 1 by turning on the external trigger by a command from a control unit of the system in which the sensor is employed, so that a DC offset can be generated in the output 15 of the detection circuit 10.

Monitoring this can detect the breakage of signal wires, and further judge whether the sensitivity is normal or not due to a trouble in circuit parts.

Further, the second driving circuit 13 may include means for compensating a temperature characteristic of the piezoelectric characteristic or an impedance due to fluid resistance of the vibrator 1, for example, thermistor compensating means 13d. The circuit thus induces a stable pseudo-Coriolis vibration regardless of an ambient temperature, and helps judging the fault in the sensor more precisely.

Moreover, the second driving circuit 13 may include a low frequency oscillator and a multiplication circuit. The signal from the phase shifter 13b, which is used as a carrier, is amplitude-modulated with the signal from the oscillator. The modulated signal is applied to the second exciter 12b through the switch 13c. An alternating-current signal can be generated in the output 15 of the detection circuit 10, and makes the characteristic of the low pass filter 10f of the detection circuit 10 enabled to be diagnosed.

(Exemplary Embodiment 3)

Figure 5:
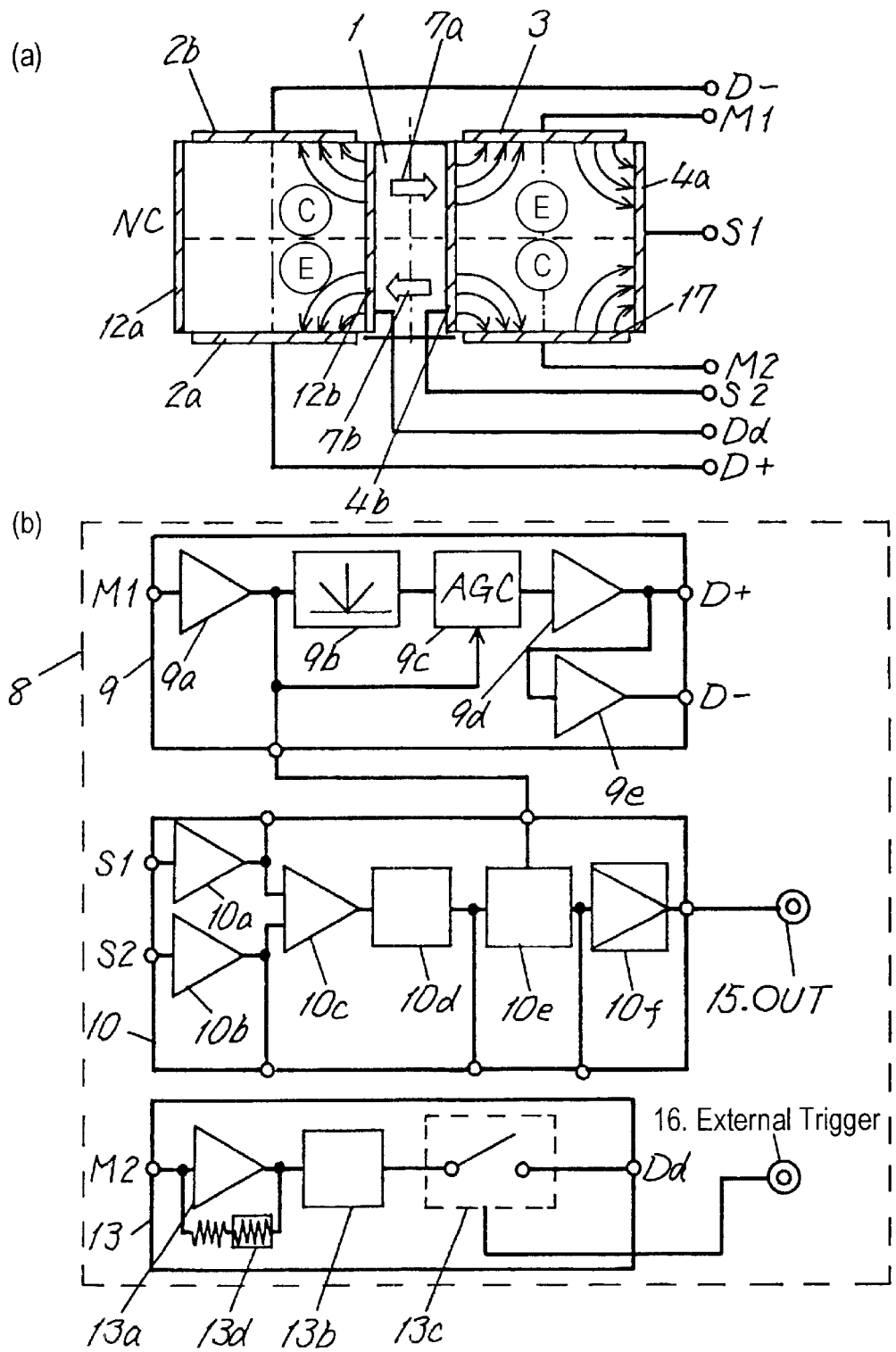
FIG. 5(a) is a block diagram of an angular velocity sensor according to embodiment 3 of the present invention.
FIG. 5(b) is a circuit diagram of a circuit section of the sensor.

FIG. 5 shows an angular velocity sensor according to exemplary embodiment 3 of the present invention.

In embodiment 2, the signal driving the second exciter 12b is obtained from the signal on the basis of the electric charge of the vibration detector 3. In embodiment 3, it is obtained from a second vibration detector 17 opposite to the vibration detector 3, and other structure and operation are the same as in embodiment 2. In this constitution, the GND connection electrode is completely excluded successfully among electrodes on the vibrator 1.

Therefore, as compared with embodiment 2, the sensor obtains a higher reliability.

Industrial Applicability

The angular velocity sensor having above configurations detects a breakage of input lines from the Coriolis detectors to the detection circuit. And generating pseudo-Coriolis force by an external input, the sensor totally including the circuit section can be diagnosed in total. The angular velocity sensor suited to applications requesting high reliability such as an vehicle control and an air bag system is provided.

What is claimed:

1. An angular velocity sensor comprising:
   an element section comprising a piezo electric element, said piezoelectric element comprising:
      a vibrator;
      a first exciter for providing said vibrator with drive vibration, said first exciter comprising an electrode;
      a vibration detector for detecting a vibration level of said vibrator, said vibration detector comprising an electrode; and
      at least two Coriolis detectors for detecting Coriolis vibration generated depending on an input angular velocity, said Coriolis detectors comprising electrodes; and
   a circuit section comprising:
      a driving circuit for receiving a signal from said vibration detector and issuing a signal to said first exciter;
      detection circuits for receiving signals from said Coriolis detectors, respectively;
      a combining unit for combining signals from said detection circuits;
      a level judging circuit for judging an abnormal level of electric charges occurring in said Coriolis detectors; and
      output means for issuing an output when the abnormal level is judged,
   wherein said Coriolis detectors are operable to issue output signals, each of the output signals containing a component of the drive vibration, the component being larger than a reference level of said level judging circuit, and
   wherein said electrodes are laid out so that a signal from said combining unit may contain a component of the drive vibration, the component being smaller than the reference level.

2. The angular velocity sensor according to claim 1, wherein at least one of said electrodes is trimmed such that the component of the drive vibration contained in the signal from said combining unit is adjusted substantially to zero.

3. The angular velocity sensor according to claim 1, wherein said piezoelectric element has a bimorph structure.

4. An angular velocity sensor comprising
   an element section comprising a piezoelectric element, said piezoelectric element comprising:
      a vibrator;
      a first exciter for providing said vibrator with drive vibration;
      a second exciter for inducing a pseudo-Coriolis vibration in said vibrator;
      a vibration detector for detecting a vibration level of said vibrator; and
      a Coriolis detector for detecting Coriolis vibration generated depending on an input angular velocity; and
   a circuit section comprising:

a driving circuit for receiving a signal from said vibration detector and issuing a signal to said first exciter; and a detection circuit for receiving a signal from said Coriolis detector;

a second driving circuit for issuing, to said second exciter, a signal formed by shifting a signal from said vibration detector in phase by 90 degrees; and a switch for connecting and disconnecting said second driving circuit to said second exciter according to an external trigger.

5. The angular velocity sensor according to claim 4 further comprising:

a low frequency oscillator; and a modulator for amplitude-modulating the signal from said second driving circuit with a signal from said oscillator and for applying the amplitude-modulated signal to said second exciter.

6. The angular velocity sensor according to claim 4, wherein said piezoelectric element has a bimorph structure.

7. The angular velocity sensor according to claim 4, wherein said second driving circuit is compensated for a temperature characteristic of a drive impedance of said element section.

8. An angular velocity sensor comprising an element section comprising a piezoelectric element, said piezoelectric element comprising:

a vibrator;

a first exciter for providing said vibrator with drive vibration;

a second exciter for inducing pseudo-Coriolis vibration in said vibrator;

a first vibration detector for detecting a vibration level of said vibrator;

a second vibration detector for detecting a vibration level of said vibrator; and a Coriolis detector for detecting Coriolis vibration generated depending on an input angular velocity;

a circuit section comprising:

a driving circuit for receiving a signal from said first vibration detector and issuing a signal to said first exciter; and a detection circuit for receiving a signal from said Coriolis detector;

a second driving circuit for issuing, to said second exciter, a signal formed by shifting the signal from said second vibration detector in phase by 90 degrees; and a switch for connecting and disconnecting said second driving circuit to said second exciter according to an external trigger.

9. The angular velocity sensor according to claim 8 further comprising:

a low frequency oscillator; and a modulator for amplitude-modulating the signal from said second driving circuit with a signal from said oscillator and for applying the amplitude-modulated signal to said second exciter.

10. The angular velocity sensor according to claim 8, wherein said piezoelectric element has a bimorph structure.

11. The angular velocity sensor according to claim 8, wherein said second driving circuit is compensated for a temperature characteristic of a drive impedance of said element section.

\* \* \* \* \*